US008660409B2

(12) United States Patent
DeLuca et al.

(10) Patent No.: US 8,660,409 B2
(45) Date of Patent: Feb. 25, 2014

(54) PREDICTIVE PERSONAL VIDEO RECORDER OPERATION

(75) Inventors: Lisa Seacat DeLuca, San Francisco, CA (US); Timothy J. Eby, Austin, TX (US); Travis M. Grigsby, Austin, TX (US); Frank L. Jania, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 12/434,503

(22) Filed: May 1, 2009

(65) Prior Publication Data

US 2010/0277606 A1    Nov. 4, 2010

(51) Int. Cl.
*H04N 5/76* (2006.01)
*H04N 9/80* (2006.01)

(52) U.S. Cl.
USPC ........... 386/291; 386/235; 386/239; 386/248; 386/296

(58) Field of Classification Search
USPC .............................. 725/41; 386/233, 291–299
See application file for complete search history.

(56) References Cited

U.S. PATENT DOCUMENTS

| | | | | |
|---|---|---|---|---|
| 6,985,188 | B1 * | 1/2006 | Hurst, Jr. ....................... | 348/553 |
| 7,873,982 | B2 * | 1/2011 | Smith et al. .................... | 725/136 |
| 2004/0181813 | A1 * | 9/2004 | Ota et al. ....................... | 725/131 |
| 2005/0149975 | A1 * | 7/2005 | Jutzi .............................. | 725/95 |
| 2005/0276567 | A1 * | 12/2005 | Okuyama et al. ............... | 386/46 |
| 2007/0128899 | A1 * | 6/2007 | Mayer ............................ | 439/152 |
| 2007/0192796 | A1 * | 8/2007 | Iwabuchi et al. ............... | 725/46 |
| 2007/0220554 | A1 * | 9/2007 | Barton et al. ................... | 725/46 |
| 2008/0002938 | A1 * | 1/2008 | Osborne ......................... | 386/46 |
| 2008/0025723 | A1 * | 1/2008 | Mayer et al. ................... | 398/58 |
| 2009/0002570 | A1 * | 1/2009 | Oki ................................. | 348/726 |
| 2009/0055870 | A1 * | 2/2009 | Horibe ............................ | 725/46 |
| 2010/0031162 | A1 * | 2/2010 | Wiser et al. .................... | 715/747 |

OTHER PUBLICATIONS

Tivo HD—Do Both Tuners Buffer?, [online] Tivo Community Forum, posted Oct. 3, 2007 [retrieved online] retrieved from the Internet: <http://www.tivocommunity.com/tivo-vb/showthread.php?t=368586>.

* cited by examiner

*Primary Examiner* — Hung Dang
(74) *Attorney, Agent, or Firm* — Patents on Demand P.A.; Brian K. Buchheit; Scott M. Garrett (57) ABSTRACT

A predictive personal video recorder (PVR) can include a tuner, a buffer, a predictive tuner, and a predictive buffer. The tuner can be configured to allow viewing of a currently-selected digital video channel chosen from a plurality of digital video channels received by a predictive PVR. The buffer can be configured to store video data of the currently-selected digital video channel, allowing time-shifted viewing of the currently-selected digital video channel. The predictive tuner can be configured to capture video data for a predicted digital video channel. The predicted digital video channel can be selected based upon a predictive factor. The predictive buffer can be configured to store the captured video data for the predicted digital video channel received by the predictive tuner to allow time-shifted viewing of said predicted digital video channel.

20 Claims, 3 Drawing Sheets

PREDICTIVE PERSONAL VIDEO RECORDER OPERATION

BACKGROUND

The present invention relates to the field of video recording devices and, more particularly, to personal video recording devices that buffer the video signal for a predicted digital television channel.

Personal video recording (PVR) devices have gained popularity in recent years in part because they allow a viewer to watch a received broadcast or other transmitted video or television signal and while watching the received program, pause, rewind, and fast forward the program by virtue of the signal content being buffered for time shifting. For example, as a viewer is watching a program, the user may pause the viewing while the received signal content continues to be buffered. When the viewer is ready to resume viewing, the program is continued from the pause point in the buffer as new content continues to be added to the buffer. Buffering allows viewers to skip commercials, halt viewing to engage in some other activity, and re-watch portions of a program at their leisure.

The first PVRs had a single tuner and used a single buffer, which only buffered the channel being watched. The buffering of only a presently viewed channel, however, is limiting. Only the presently viewed channel is buffered and available for time-shifted viewing. When a user changes channels, the buffer is generally re-initialized, losing the previously buffered video data. Thus, a user of the PVR loses the ability to perform time-shifting operations for a buffered program upon return to that channel.

For example, when a user watches a news program on Channel A, the news program is buffered in the PVR. When the user changes to Channel B to check the score of a sports game, the news program data is purged and the sports game starts to be buffered. After seeing the score, the user then returns to Channel A. The buffer is again purged and the PVR begins storing the data for the news program from the current point in time; the user cannot rewind the news program to view the content for the time period spent viewing Channel B.

To overcome this issue, dual-tuner PVRs have been developed, which allow a user to record one channel while watching and buffering another channel. However, dual-tuner PVRs require manual programming of the secondary channel for buffering. Neither approach attempts to anticipate user channel changes.

BRIEF SUMMARY

One aspect of the present invention can include a predictive personal video recorder (PVR). The predictive PVR can include a tuner, a buffer, a predictive tuner, and a predictive buffer. The tuner can be configured to allow viewing of a currently-selected digital video channel chosen from a plurality of digital video channels received by a predictive PVR. The buffer can be configured to store video data of the currently-selected digital video channel, allowing time-shifted viewing of the currently-selected digital video channel. The predictive tuner can be configured to capture video data for a predicted digital video channel. The predicted digital video channel can be selected based upon a predictive factor. The predictive buffer can be configured to store the captured video data for the predicted digital video channel received by the predictive tuner to allow time-shifted viewing of said predicted digital video channel.

Another aspect of the present invention can include a method for the predictive buffering operation of a personal video recorder (PVR). A user-selection of a digital video channel for viewing can be received from a set of received digital video channels by a predictive PVR. The user-selection can utilize an input control mechanism associated with the predictive PVR. In response to the user-selection, a predicted digital video channel can be automatically and dynamically determined, excluding the user-selected digital video channel. Video data associated with the predicted digital video channel can then be captured in a memory store of the predictive PVR.

Yet another aspect of the present invention can include a predictive personal video recording system. The predictive personal video recording system can include a predictive personal video recorder (PVR) and an input control mechanism. The predictive PVR can include a tuner, a buffer, a predictive tuner, and a predictive buffer. The tuner can be configured to allow viewing of a currently-selected digital video channel chosen from a plurality of digital video channels received by a predictive PVR. The buffer can be configured to store video data of the currently-selected digital video channel, allowing time-shifted viewing of the currently-selected digital video channel. The predictive tuner can be configured to capture video data for a predicted digital video channel. The predicted digital video channel can be selected based upon a predictive factor. The predictive buffer can be configured to store the captured video data for the predicted digital video channel received by the predictive tuner to allow time-shifted viewing of said predicted digital video channel. The input control mechanism can be configured to transmit the user-entered input to the predictive PVR. User-entered input can include operational and predictive inputs.

DETAILED DESCRIPTION

The present invention discloses a personal video recorder (PVR) that anticipates a user's next digital video channel selection. A predictive tuner component of the predictive PVR can determine the predicted digital video channel and video data for the predicted digital video channel can be stored in an associated predictive buffer. This can allow for time-shifted viewing of the predicted digital video channel should the user elect to switch to the predicted digital video channel.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
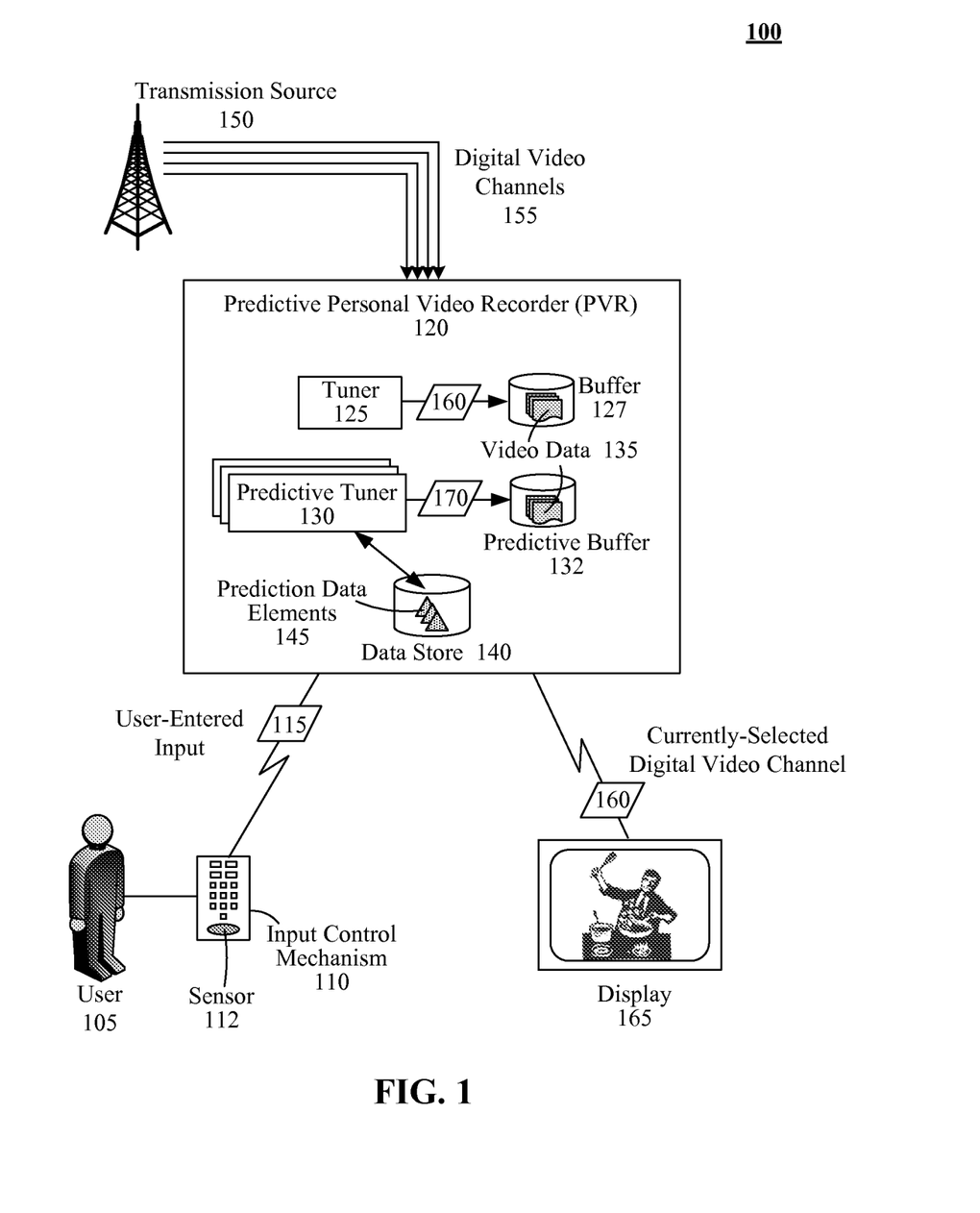
FIG. 1 is a schematic diagram illustrating a system for the predictive operation of a personal video recorder (PVR) in accordance with embodiments of the inventive arrangements disclosed herein.

FIG. 1 is a schematic diagram illustrating a system 100 for the predictive operation of a personal video recorder (PVR) 120 in accordance with embodiments of the inventive arrangements disclosed herein. In system 100, predictive PVR 120 can attempt to anticipate the digital video channel 155 that the user 105 will view next, and begin to capture the video data 135 for the predicted digital video channel 170 in a predictive buffer 132.

A user 105 can utilize an input control mechanism 110 to send user-entered input 115 to the predictive PVR 120. The input control mechanism 110 can represent a hardware device, such as a remote control, and/or a software application, such as a remote control interface for a media player, configured to capture and convey the user-entered input 115.

The user-entered input 115 can include operational inputs and/or predictive inputs. Operational inputs can represent the commands typically used to control the operation of the predictive PVR 120, such as PLAY and STOP. Predictive inputs can correspond to inputs captured by the input control mechanism 110 that only pertain to the predictive functionality of the predictive PVR 120. To handle capture of predictive inputs, the input control mechanism 110 can include one or more specialized sensors 112, such as tactile feedback sensors and/or biometric sensors.

The predictive PVR 120 can represent a personal video recording device configured to anticipate a user's 105 viewing selection from a set of digital video channels 155 received from a transmission source 150. The predictive PVR 120 can be implemented as a stand-alone device, a computing system, or a hybrid system. For example, the predictive PVR 120 can be an off-the-shelf electronic device or software application operating upon a media server that provides the necessary functionality.

The components of the predictive PVR 120 can include a tuner 125 with a buffer 127, a predictive tuner 130 with a predictive buffer 132, and a data store 140. It should be noted that the predictive PVR 120 can include additional components supporting typical operation of a PVR that are not shown in system 100, and, that such the additional components do not affect operation of this embodiment of the present invention.

The tuner 125 can represent the component of the predictive PVR 120 that handles presentation of the user's 105 currently-selected digital video channel 160 upon the display 165. As typical with PVR functionality, the tuner 125 can also store the video data 135 associated with the currently-selected digital video channel 160 in an associated buffer 127. Capture of the video data 135 can allow the user 105 to perform time-shifting operations upon the captured video data 135.

For example, as the user 105 views the currently-selected digital video channel 160, the video data 135 is continuously captured. The user 105 can then PAUSE 115 the presentation of the currently-selected digital video channel 160 to answer the phone. While paused, the tuner 125 can continue to capture the video data 135 in the buffer 127. When the user 105 returns and selects PLAY 115, presentation of the currently-selected digital video channel 160 can resume from the pause point while the tuner 125 continues to capture video data 135 for the current time period.

In an alternate embodiment, the predictive PVR 120 can utilize multiple tuners 125 with corresponding buffers 127 to support additional PVR functionality, such as PICTURE IN PICTURE (PIP). However, it should be noted that the use of multiple tuners 125 does not detract from this embodiment of the present invention since the user 105 must program the digital video channels 155 used with the PIP functionality, whereas the predictive operation of the predictive PVR 120 does not rely upon user 105 programming.

The predictive tuner 130 can represent the hardware and/or software components of the predictive PVR 120 configured to automatically and dynamically determine a predicted digital video channel 170 from the set of received digital video channels 155 and capture the video data 135 for the predicted digital video channel 170 in the predictive buffer 132. The predicted digital video channel 170 can represent the digital video channel 155 that the user 105 is most likely to select next for viewing. Capture of the video data 135 for the predicted digital video channel 170 can allow the user 105 to be able to immediately perform time-shifting operations.

For example, as the user 105 views Channel A 160, the predictive PVR 120 can be capturing the video data 135 for Channel W 170. Should the user 105 change from Channel A 160 to Channel W 170, the user 105 can immediately perform operations to view the previously-captured video data 135. That is, upon switching to Channel W 170, the user 105 can immediately rewind the program to the point where the video data 135 for Channel W 170 started to be captured.

It is crucial to emphasize that capability is unavailable in conventional PVRs, even those having multiple tuners 125. The capturing of video data 135 to perform time-shifting operations upon typically requires user-input, such as programming the digital video channels 155 for PIP. This embodiment of the present invention begins to capture video data 135 for a digital video channel 155 that the user 105 has yet to actively select. Thus, video data 135 data is immediately available to perform time-shifting functions upon when the switch is made.

To determine the predicted digital video channel 170, the predictive tuner 130 can utilize prediction data elements 145 stored within the data store 140. The prediction data elements 145 can represent a variety of information pertaining to user viewing of digital video channels 155, such as the predictive inputs that can be captured by the sensor 112 of the input control mechanism 110. The prediction data elements 145 can be captured by the predictive PVR 120 in the data store 140.

In another embodiment, one or more of the prediction data elements 145 can be stored in locations external to the predictive PVR 120 and/or data store 140. For example, the predictive PVR 120 can be configured to access a file server of a home media computing system to access the user's 105 viewing preferences 145.

Determination of the predicted digital video channel 170 by the predictive tuner 130 can be configured to occur in such a manner as to maximize capture of the video data 135. For example, determination of the predicted digital video channel 170 can occur continuously, however, the capturing of a new predicted digital video channel 170 may not occur if the program is within the last five minutes of its time slot. That is, some additional logic can be built into the predictive tuner 130 to provide continuity to the video data 135 being captured.

Alternately, determination of the predicted digital video channel 170 can be configured to occur on an event-trigger basis, such as every time the user 105 changes the currently-selected digital video channel 160 or turns on the display 165.

In yet another embodiment, the predictive PVR 120 can utilize multiple predictive tuners 130. Each predictive tuner 130 can be configured to independently determine and capture a predicted digital video channel 170. In such an embodiment, the predictive tuner 130 can be configured to handle the determination and ranking of multiple predicted digital video channels 170.

As used herein, presented buffers and data store 127, 132, and 140 can be a physical or virtual storage space configured to store digital information. The buffers and data store 127, 132, and 140 can be physically implemented within any type of hardware including, but not limited to, a magnetic disk, an optical disk, a semiconductor memory, a digitally encoded plastic memory, a holographic memory, or any other recording medium. Further, the buffers and data store 127, 132, and 140 can be a stand-alone storage unit as well as a storage unit formed from a plurality of physical devices. Additionally, information can be stored within the buffers and data store 127, 132, and 140 in a variety of manners. For example, information can be stored within a database structure or can be stored within one or more files of a file storage system, where each file may or may not be indexed for information searching purposes. Further, buffers and data store 127, 132, and/or 140 can utilize one or more encryption mechanisms to protect stored information from unauthorized access.

Figure 2:
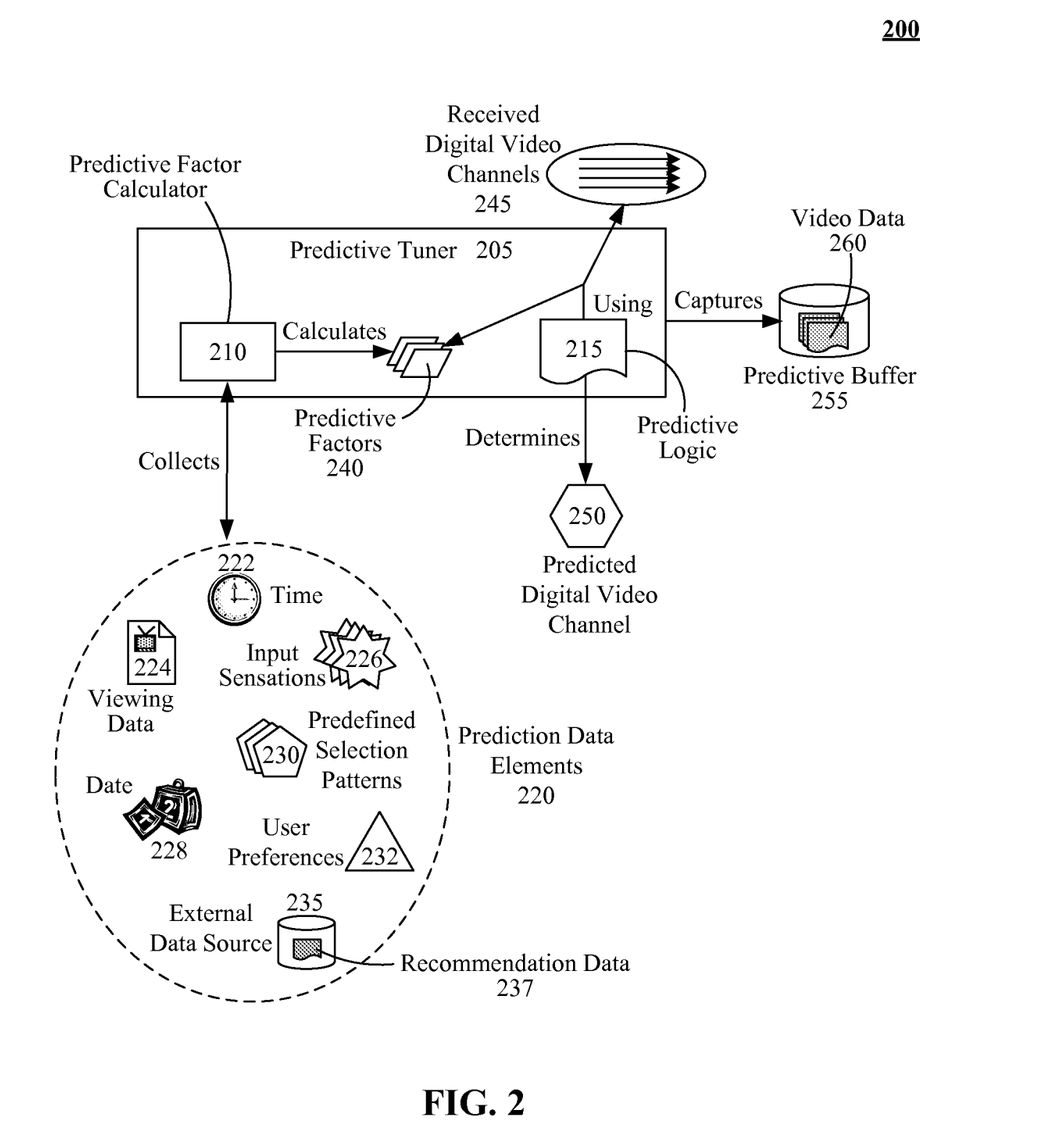
FIG. 2 is an illustrated flow diagram of predictive tuner utilized by a predictive personal video recorder (PVR) in accordance with an embodiment of the inventive arrangements disclosed herein.

FIG. 2 is an illustrated flow diagram 200 of predictive tuner 205 utilized by a predictive personal video recorder (PVR) in accordance with embodiments of the inventive arrangements disclosed herein. The predictive tuner 205 of flow diagram 200 can be utilized within the context of system 100 or any other system that supports predictive operation of a PVR.

In flow diagram 200, the predictive tuner 205 can include a predictive factor calculator 210 and a set of predictive logic 215. The predictive factor calculator 210 can utilize the set of prediction data elements 220 to calculate predictive factors 240. A predictive factor 240 can be calculated for each received digital video channel 245 and can quantify the likelihood that the user will select the received digital video channel 245.

The prediction data elements 220 can represent various conditions and their associated values that the predictive factor calculator 210 can utilize when calculating a predictive factor 240 for a received digital video channel 245. As shown flow diagram 200, examples of prediction data elements 220 can include, but are not limited to, the time 222, viewing data 224, input sensations 226, the date 228, predefined selection patterns 230, user preferences 232, and recommendation data 237 from an external data source 235.

The time 222 can represent the current time of day as kept by a chronometer of the predictive PVR. The time 222 can be compared to programming schedules for the received digital video channels 245 and used in conjunction with other prediction data elements 220, such as the date 228. The date 228 can represent the current calendar date at which the operation occurs.

The viewing data 224 can represent user viewing habit information, such as a user's most-watched program. Viewing data 224 can be collected by the predictive PVR or another data system. The input sensations 226 can represent the various predictive inputs that can be collected from the user, such as haptic responses via the input control mechanism. For example, heat-sensitive input buttons on the input control mechanism can detect placement of the user's finger prior to a button being pressed.

The predefined selection patterns 230 can represent sequences of digital video channel selections. The predictive tuner 205 can keep track of a user's selection of received digital video channel 245 to determine if the selections match a predefined selection pattern 230. If a predefined selection pattern 230 is met, then the predicted digital video channel 250 can be automatically set to the next digital video channel in the predefined selection pattern 230.

For example, it is common for a user to consecutively visit or flip through channels. Thus, predefined selection patterns 230 can exist that define how to recognize a user scrolling through the channels.

In another embodiment, the predictive tuner 205 can include a pattern creation component to create new predefined selection patterns 230 from user selections over time.

The user preferences 232 can represent user-configurable data elements for the operation of the predictive tuner 205, such as programming language and channel exclusions. The external data source 235 can represent a data store remotely located from the predictive PVR that can contain recommendation data 237 pertinent to the user. For example, the predictive PVR can be configured to access a social networking server 235 to gather recommendation data 237 about programming from the user's friends.

The predictive logic 215 can represent the algorithm utilized by the predictive tuner 205 to determine the predicted digital video channel 250 using the predictive factors 240 and the received digital video channels 245. An example of predictive logic 215 can be to ignore received digital video channels 245 that are experiencing an outage.

Once the predicted digital video channel 250 is determined, the predictive tuner 205 can then capture the video data 260 in the predictive buffer 255.

Figure 3:
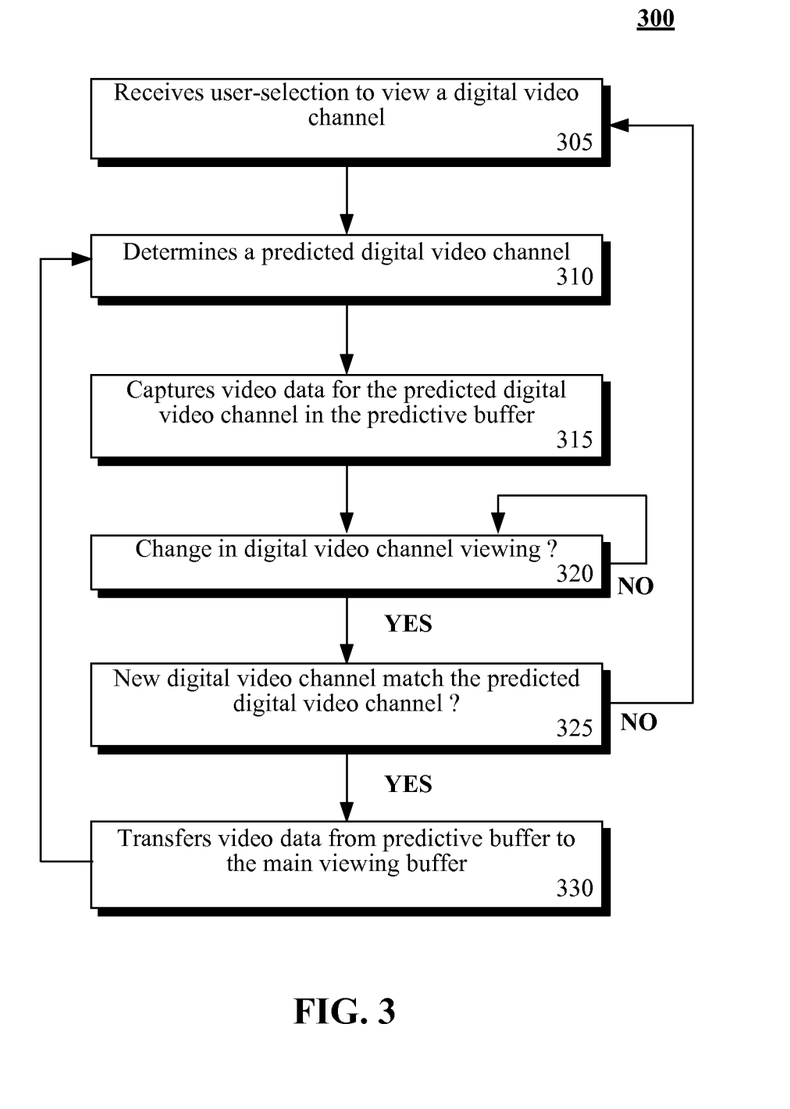
FIG. 3 is a flow chart of a method that describes predictive operation of a personal video recorder (PVR) in accordance with embodiments of the inventive arrangements disclosed herein.

FIG. 3 is a flow chart of a method 300 that describes predictive operation of a personal video recorder (PVR) in accordance with an embodiment of the inventive arrangements disclosed herein. Method 300 can be performed in the context of system 100 and/or utilizing the predictive tuner 205 of flow diagram 200.

Method 300 can begin with step 305 where the predictive PVR can receive a user-selection to view a digital video channel. The predicted digital video channel can then be determined in step 310. In step 315, the video data for the predicted digital video channel can be captured in the predictive buffer. Step 315 can be automatically performed by the predictive tuner of the predictive PVR.

In step 320, it can be determined if a change in digital video channel viewing has occurred. When a change has not occurred, flow can continue to loop to step 320. When a change has occurred, it can be determined if the new digital video channel matches the predicted digital video channel in step 325.

When the new digital video channel does not match the predicted digital video channel, flow can return to step 305, repeating method 300. When the new digital video channel does match the predicted digital video channel, step 330 can execute where the video data from the predictive buffer can be transferred to the main viewing buffer. From step 330, flow can return to step 310 to repeat determination of the predicted digital video channel.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A predictive personal video recorder (PVR) comprising:
    a tuner configured to allow viewing of a currently-selected digital video channel upon a display, wherein said currently-selected digital video channel is chosen from a plurality of digital video channels received by a predictive PVR;
    a buffer configured to store video data of the currently-selected digital video channel received by the tuner, wherein said stored video data allows time-shifted viewing of the currently-selected digital video channel;
    a data store, which is a non-transitory storage medium, comprising a plurality of stored predictive data elements, wherein the predictive data elements comprise user preferences, wherein the user preferences include user exclusions of video programming language exclusions and channel exclusions;
    a predictive factor calculator for calculating a predictive factor using the predictive data elements of the data store, wherein the predictive factor is a numeric value that quantifies a viewing likelihood for a digital video channel by a user of the predictive PVR, wherein the predictive value calculator calculates predictive factors for a plurality of candidate digital video channels, wherein the candidate digital video channels are ordered by the calculated predictive factors according to value, wherein the candidate digital video channel with the highest calculated predictive factor is determined to be a predicted digital video channel, wherein channels excluded per one of the user exclusions are not eligible to be the predicted digital video channel by nature of the user exclusions specified by the stored user preferences;
    a predictive tuner configured to capture video data for the predicted digital video channel; and
    a predictive buffer configured to store the captured video data for the predicted digital video channel received by the predictive tuner to allow time-shifted viewing of said predicted digital video channel.

2. The predictive PVR of claim 1, wherein the predictive buffer captures video on the predictive channel, which is a digital video channel that the user has yet to actively select.

3. The predictive PVR of claim 1, wherein the plurality of prediction data elements comprises an identification corresponding to a user viewing the currently-selected digital video channel, historical viewing data associated with the user and a user-configured viewing preference of the user.

4. The predictive PVR of claim 1, wherein the predictive PVR is a personal video recording device that anticipates a user's viewing selection from a set of digital video channels received from a transmission source, wherein said anticipated viewing selection is one that the user has not actively selected, wherein the buffer and the predictive buffer concurrently store captured video data from different channels to enable time-shifted functions for the different channels for which captured video data is stored.

5. The predictive PVR of claim 1, wherein the predictive digital video channel is determined, the predictive tuner is tuned to the predictive channel, and the predictive buffer records the predicted video channel responsive to an event trigger of turning on a display for viewing digital video.

6. The predictive PVR of claim 1, further comprising:
    a network interface configured to access a social networking system, wherein the predictive digital video channel is determined based on a recommendation of a friend of a user viewing the current digital video channel, wherein said predictive personal video recorder obtains the recommendation from the social networking system.

7. The predictive PVR of claim 1, wherein the predictive buffer stores captured video data that a user has not actively selected based on a prediction by an algorithm of the predictive PVR, wherein the captured video data of the predictive buffer that was recorded without user commands, is available for time-shifted functions in a manner approximately or substantially similar to time-shifted functions available for the currently-selected digital video channel that is enabled using the buffer that stores video data of the currently-selected digital video channel.

8. The predictive PVR of claim 1, wherein the predictive PVR comprises a plurality of predictive tuners, wherein each predictive tuner independently captures a distinctly determined predicted digital video channel.

9. A method for predictive buffering operation for a personal video recorder (PVR) comprising:
    receiving user entered operational and predictive inputs via an input control mechanism, wherein optional inputs represent commands used to control operations of the personal video recorder that are not specific to predictive functionality, wherein the predictive inputs are inputs that only pertain to the predictive functionality of the predictive PVR, wherein said predictive inputs are stored in a non-transitory storage medium of the personal video recorder as prediction data elements, wherein the predictive data elements comprise user preferences, wherein the user preferences include user exclusions of video programming language exclusions and channel exclusions;
    receiving a user-selection, which is one of the operational inputs, of a digital video channel for viewing from a plurality of received digital video channels by a predictive PVR, wherein the user-selection utilizes an input control mechanism associated with the predictive PVR;
    in response to the user-selection, automatically and dynamically determining a predicted digital video channel from the plurality of received digital video channels, wherein the user-selected digital video channel is excluded from said determination, wherein channels are excluded per the channel exclusions and the video programming language exclusions of the user preferences, and wherein the predicted digital video channel is calculated using the stored prediction data elements; and
    responsive to determining the predicted video channel, capturing video data associated with the predicted digital video channel in a memory store of the predictive PVR.

10. The method of claim 9, wherein the determining of the predicted digital video channel further comprises:
    calculating a predictive factor for each received digital video channel, wherein the predictive factor quantifies a viewing likelihood for a received digital video channel by a user of the predictive PVR; and ordering calculated predictive factors according to value, wherein the received digital video channel corresponding to a highest calculated predictive factor is determined to be the predicted digital video channel, wherein the highest calculated predictive factor indicates a high viewing likelihood for the corresponding received digital video channel.

11. The method of claim 10, wherein calculation of the predictive factor further comprises:

collecting at least one value for at least one of the prediction data elements, wherein the at least one value for the at least one prediction data element influences the calculation of the predictive factor for one or more digital video channels, and, wherein the at least one prediction data element is a user specific value, wherein the determining of the predicted video channel is specific for a current user of the predictive PVR based on previous stored user specific criteria.

12. The method of claim 11, wherein the sensor receives a haptic response made by the user upon the input control mechanism.

13. The method of claim 11, wherein the at least one prediction data element comprises:

an identification corresponding to the user viewing the currently-selected digital video channel, historical viewing data associated with the user, and a user-configured viewing preference.

14. The method of claim 9, further comprising:

when the user-selection for the digital video channel for viewing matches the predicted digital video channel, automatically transferring the captured video data for the predicted digital video channel from a predictive buffer to a different buffer.

15. The method of claim 9, wherein the determining of the predicted digital video channel occurs automatically responsive to an event trigger of turning on the display device to which the predictive PVR is connected.

16. The method of claim 9, wherein the determining of the predicted digital video channel further comprises:

ascertaining that the received user-selection matches a predefined selection pattern, wherein the predefined selection pattern describes a sequence of digital video channel selections; and automatically setting the predicted digital video channel to a digital video channel that is next in the predefined selection pattern.

17. A predictive personal video recording system comprising:

a predictive personal video recorder (PVR) comprising:

a tuner configured to allow viewing of a currently-selected digital video channel upon a display, wherein said currently-selected digital video channel is chosen from a plurality of digital video channels received by a predictive PVR;

a buffer configured to store video data of the currently-selected digital video channel received by the tuner, wherein said stored video data allows time-shifted viewing of the currently-selected digital video channel;

a predictive tuner configured to capture video data for a predicted digital video channel, wherein the predicted digital video channel is selected based upon a predictive factor and excludes the currently-selected digital video channel;

a predictive buffer configured to store the captured video data for the predicted digital video channel received by the predictive tuner to allow time-shifted viewing of said predicted digital video channel, wherein the captured video data stored in the predictive buffer is not stored based on an explicit user command to record and is not based on a channel a user is actively watching, wherein the captured video data stored in the predictive buffer permits time-shifting functions for the predicted video channel substantially similar to those time-shifting functions for the currently selected digital video channel enabled via the buffer;

a predictive factor calculator for calculating a predictive factor using the predictive data elements of the data store, wherein the predictive factor is a numeric value that quantifies a viewing likelihood for a digital video channel by a user of the predictive PVR, wherein the predictive value calculator calculates predictive factors for a plurality of candidate digital video channels, wherein the candidate digital video channels are ordered by the calculated predictive factors according to value, wherein the candidate digital video channel with the highest calculated predictive factor is determined to be a predicted digital video channel; and an input control mechanism configured to transmit user-entered input to the predictive PVR, wherein said user-entered input comprises an operational input and a predictive input, wherein optional input represents a command used to control operations of the personal video recorder that are not specific to predictive functionality, wherein the predictive input is an input that only pertain to the predictive functionality of the predictive PVR, wherein said predictive input is stored in a non-transitory storage medium of the personal video recorder as a prediction data element, wherein the non-transitory storage medium comprises a plurality of stored predictive data elements, wherein the predictive data elements comprise user preferences, wherein the user preferences include user exclusions of video programming language exclusions and channel exclusions, wherein the predictive tuner excludes channels per the user exclusions of video programming language exclusions and per the channel exclusions.

18. The predictive personal video recording system of claim 17, wherein the user-entered input is a predictive input, wherein the input control mechanism further comprises:

at least one haptic sensing mechanism configured to collect a haptic response from a user, wherein said haptic response is conveyed to the predictive PVR as the predictive input.

19. The predictive personal video recording system of claim 17, wherein the predictive tuner is configured to recognize changes in the currently-selected digital video channel as satisfying a predefined selection pattern, wherein the predicted digital video channel is automatically set to a digital video channel sequentially positioned to the currently-selected digital video channel within the predefined selection pattern.

20. The predictive personal video recording system of claim 17, wherein the predictive factor quantifies a viewing likelihood for a digital video channel by a user of the predictive PVR, wherein said predictive factor is based upon a plurality of prediction data elements, wherein the plurality of prediction data elements comprises an identification corresponding to the user viewing the currently-selected digital video channel.

\* \* \* \* \*